Dec. 22, 1942.    F. H. HANLEY    2,306,214
TELEGRAPH SYSTEM
Filed Nov. 12, 1941    2 Sheets-Sheet 1

INVENTOR
F. H. Hanley
BY
ATTORNEY

Dec. 22, 1942.                F. H. HANLEY                 2,306,214
                            TELEGRAPH SYSTEM
                          Filed Nov. 12, 1941            2 Sheets-Sheet 2

INVENTOR
F. H. Hanley
BY
Ralph W. Joey
ATTORNEY

Patented Dec. 22, 1942

2,306,214

UNITED STATES PATENT OFFICE 2,306,214

TELEGRAPH SYSTEM

Frank Harold Hanley, Butler, N. J., assignor to American Telephone and Telegraph Company, a corporation of New York Application November 12, 1941, Serial No. 418,695

5 Claims. (Cl. 178—69)

This invention relates to arrangements for locating or indicating short interruptions or "hits" on electrical circuits.

One of the applications of the invention may be in connection with telegraph circuits wherein the arrangements of the invention may be connected to the receiving relay so as to locate or detect short interruptions or "hits" which might be caused by any false movement of the armature from the marking contact of the relay, while the circuit is quiet or while incoming signals are being received.

Certain types of "hit" indicators, heretofore used, have been designed to operate efficiently when associated with a telegraph line having certain types of potential connected to the contacts of the receiving relay, as for example, negative potential for the marking contact and positive potential for the spacing contact. It has been found that this type of "hit" indicator may not function properly if these potentials, as is sometimes the case, are reversed, as for example, with positive potential for the marking contact and negative potential for the spacing contact. It is the primary object of this invention to provide a "hit" indicator which will function efficiently regardless of the polarities of the batteries used for the marking or spacing contacts of the receiving relay. In other words, it is the object of the invention to provide a "hit" indicator which will function efficiently if positive battery is connected to the marking contact and negative battery is connected to the spacing contact of the receiving relay or vice versa. A further object of the invention is to provide a "hit" indicator which, when connected to a telegraph line, will automatically prepare itself for functioning without the necessity of the manual operation of switching means necessary in certain arrangements of the prior art. Other objects and features of the invention will appear more fully from the detailed description thereof hereinafter given.

Figure 1:
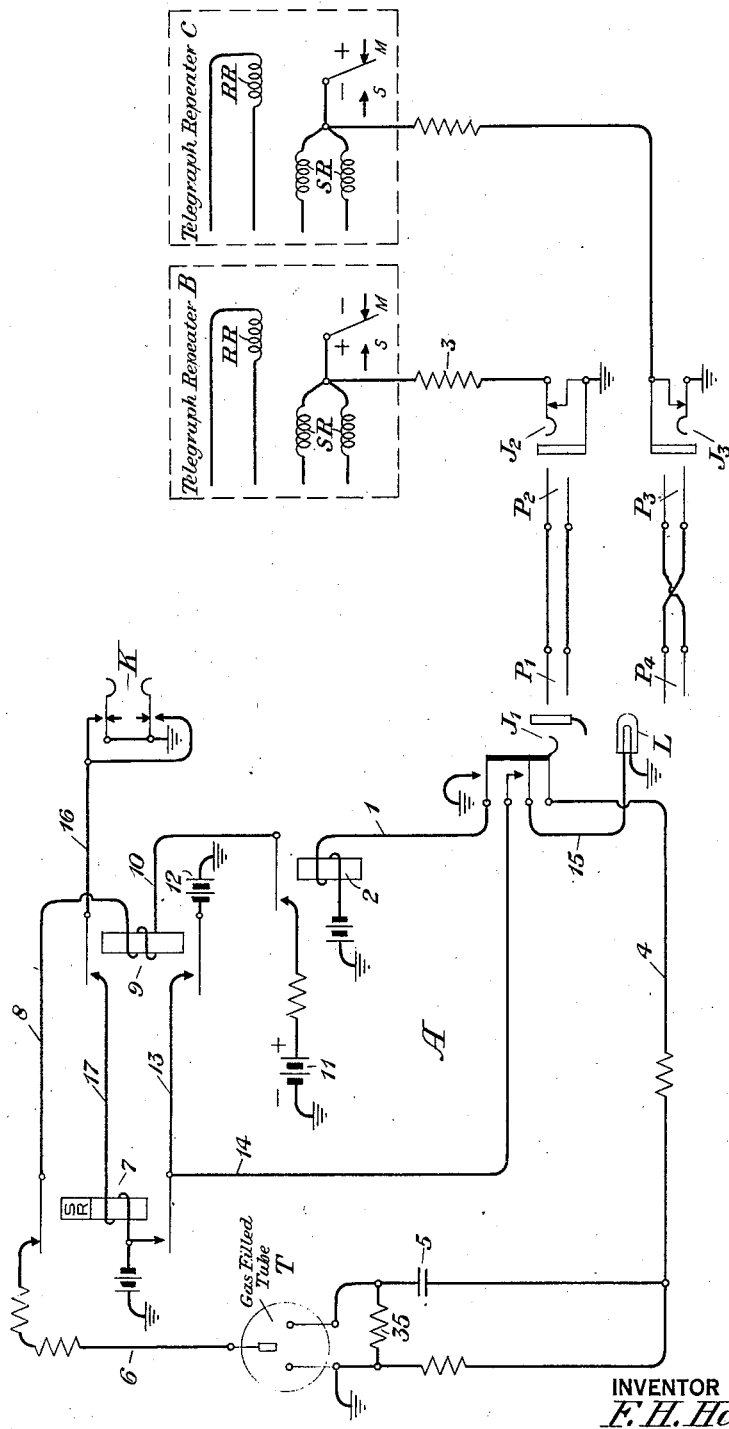
Figure 2:
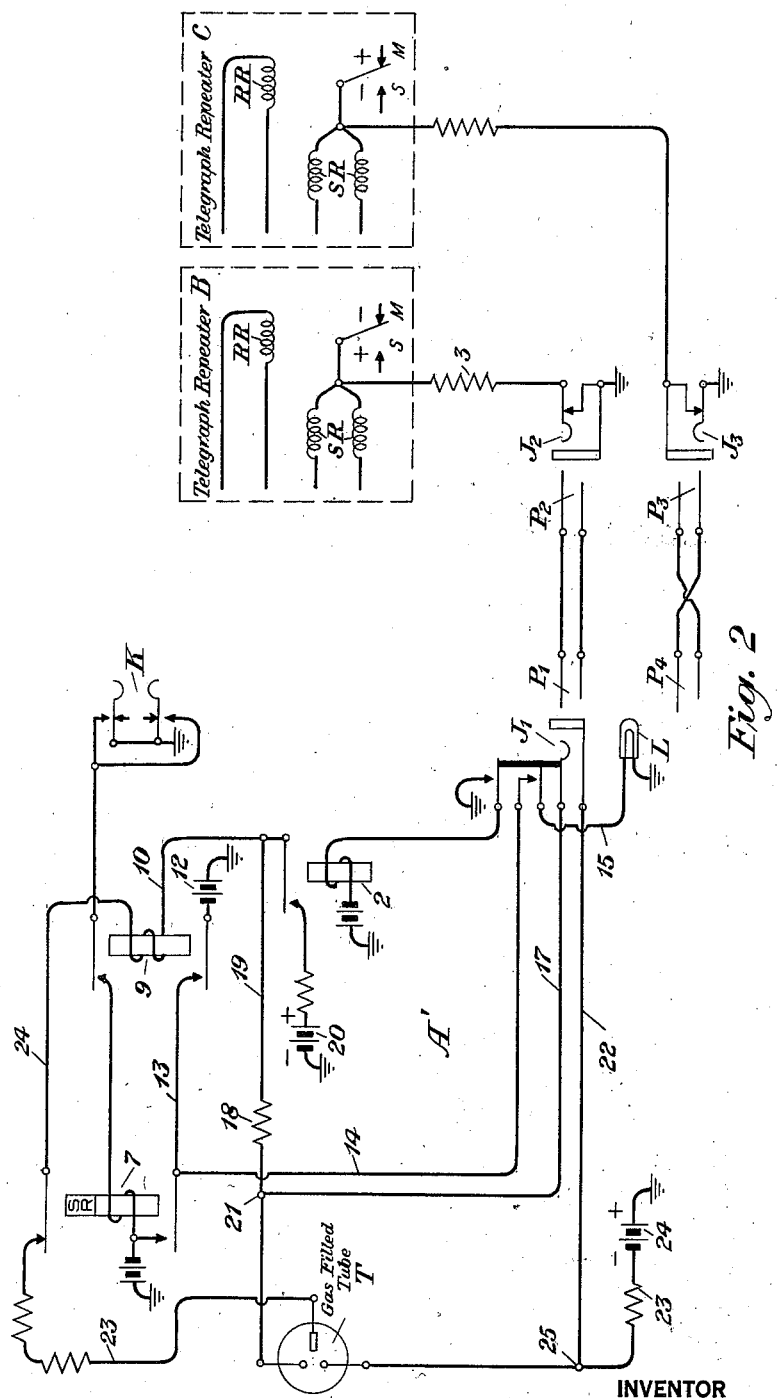

The invention may be more fully understood from the following description, together with the accompanying drawings, in Figures 1 and 2 of which the invention is illustrated. Figure 1 is a circuit diagram illustrating a "hit" indicator of the prior art. In Fig. 2 is shown a circuit diagram illustrating the "hit" indicator of this invention. Similar reference characters have been utilized to denote like parts of both of the figures.

In Fig. 1 is shown a "hit" indicator A terminating in a jack $J_1$ at a telegraph testboard. Two telegraph repeaters B and C are shown, each having a sending relay SR and a receiving relay RR. The telegraph repeater B has the armature of its receiving relay connected through a 30,000 ohm resistance to a jack $J_2$ terminating at the telegraph testboard, and the telegraph repeater C has the armature of its receiving relay connected through a 30,000 ohm resistance to the jack $J_3$ at the telegraph testboard. Most telegraph offices are provided at the testboard with "hit" indicators which give "hit" or direction of transmission indications by means of meters. Obviously it is necessary to watch the meters continuously to detect the presence of "hits." The "hit" indicators employing meters consist of the aforementioned connections on each telegraph repeater to the jacks such as $J_2$ and $J_3$ located at the telegraph testboard. The meters are provided in the testboard and are associated with the telegraph repeaters by means of cords and plugs. It is desirable that the meters always deflect in the same direction, say to the right, for a marking signal. Some telegraph repeaters will have negative battery for marking and positive battery for spacing as, for example, telegraph repeater B. Other telegraph repeaters such as C may have positive battery for marking and negative battery for spacing. In order that the meters will always deflect in the same direction, say to the right, for a marking signal, it is necessary to wire the "hit" indicator leads differently at the jacks at the testboard for different battery conditions. For example, the "hit" indicator lead from telegraph repeater B, which has negative battery for marking and positive battery for spacing, will be wired to the tip of jack $J_2$. The "hit" indicator lead for telegraph repeater C, which has positive battery for marking and negative battery for spacing, will be wired to the sleeve of jack $J_3$. With such an arrangement, when meters are used, the meters will always deflect in the same direction for a marking signal. As heretofore pointed out, it is necessary to watch the meters continuously to detect the presence of "hits." Accordingly, it is at times desirable to utilize a "hit" indicator of the type shown at A instead of a meter. The "hit" indicator A indicates the presence of a "hit" on the line by operating and locking up a visual signal such as the lamp L. It has been found that a "hit" indicator of the type shown at A will function efficiently when connected to a repeater such as B which has, for example, negative battery for marking and positive battery for spacing connected to the tip of jack J₂. However, if such a "hit" indicator should be connected to the jack J₃ associated with telegraph repeater C, which has, for example, positive battery for marking and negative battery for spacing connected to the sleeve of jack J₃, it will not function. The arrangement of the invention, namely the "hit" indicator A, as shown in Fig. 2, will function efficiently when it is connected either to a telegraph repeater such as B or a telegraph repeater such as C.

The operation of the arrangement shown in Fig. 1 is as follows:

If the "hit" indicator A is to be connected to the telegraph repeater B, plug P₁ of the cord will be inserted in jack J₁ and plug P₂ of the cord will be inserted in jack J₂. The insertion of plug P₁ in jack J₁ will close a circuit from ground, upper armature of jack J₁, over conductor 1, winding of relay 2 to battery and ground, thereby operating relay 2 even though no signals are being received on that repeater. The interconnection of jacks J₁ and J₂ by the cord circuit will connect the negative marking battery connected to the armature of the receiving relay of repeater B to the following circuit: armature of the receiving relay of repeater B, 30,000 ohm resistance 3, tip contacts of jack J₂ and plug P₂, tip contacts of plug P₁ and jack J₁, conductor 4, condenser 5, to the right-hand electrode of gas-filled tube T. The left-hand electrode of gas-filled tube T is connected to ground. The application of this voltage to condenser 5 will cause the gas-filled tube T to break down and discharge. This will complete the following circuit: from ground, left-hand electrode of tube T, middle electrode of tube T, conductor 6, contact and armature of relay 7, conductor 8, winding of relay 9, conductor 10, armature and contact of relay 2 to battery 11 and ground. This will operate the relay 9 and close the following circuit: from ground, battery 12, lower armature and contact of relay 9, conductors 13 and 14, lower contact of jack J₁, conductor 15, filament of lamp L to ground, thereby operating the lamp L. The testboard attendant will then operate the restoring key K momentarily. This will connect ground over the make contacts of key K to conductor 16, upper armature and contact of relay 9, conductor 17, winding of relay 7 to battery and ground, thereby operating relay 7. The operation of relay 7 will break the previously traced circuit through the gas-filled tube T and the relay 9. The breaking of that circuit will cause relay 9 to release, thereby breaking the previously traced circuit for relay 7. This relay is a slow release relay and after a short interval it will release and extinguish the lamp L. The condenser 5 will now have a positive charge on its upper plate and a negative charge on its lower plate. Should a "hit" now occur on the line connected to the receiving relay of telegraph repeater B, the armature of said relay will move to its spacing contact, to which is connected positive battery. This positive battery will then be connected over the previously traced circuit to condenser 5 reversing the charges on its plates. During this reversal of charge the voltage drop across resistance 35 will cause the gas-filled tube and relay 9, as previously described, to operate, thereby lighting the lamp L to indicate to the testboard attendant that a "hit" has occurred on the line connected to telegraph repeater B. Accordingly, the "hit" indicator A will function efficiently to indicate a "hit" on a line connected to a telegraph repeater such as B which has the armature of its receiving relay connected to the tip of the jack such as J₂ at the testboard. Should the "hit" indicator A be connected to a telegraph repeater such as C, which has positive battery for marking and negative battery for spacing and has the armature of its receiving relay connected to the sleeve of a jack such as J₃ at the testboard, it will be seen that the tip conductor of plug P₃ will be connected to the tip conductor of jack J₃, which will be connected to ground. The 130-volt positive marking battery will be connected to the sleeve conductor of plug P₃. Accordingly, at jack J₁ only ground will be applied to the tip conductor of jack J₁ and 130-volt positive battery will be applied to the sleeve of jack J₁, which is not connected to anything. Accordingly, the gas-filled tube T will not operate and the "hit" indicator A will not function.

Let it be assumed that the "hit" indicator A' of Fig. 2 is connected to a telegraph repeater such as B by inserting plug P₁ into jack J₁ and plug P₂ into jack J₂. Under these conditions negative marking battery will be applied to the armature of the receiving relay of repeater B and thence over the following path: 30,000-ohm resistance 3, tip contacts of jack J₂ and plug P₂, tip contacts of plug P₁ and jack J₁, conductor 17, 30,000-ohm resistance 18, conductor 19, armature and contact of relay 2 to battery and ground. Relay 2 will have been operated by the insertion of plug P₁ into jack J₁ by connection of ground to the upper contact of jack J₁ and thence through the winding of relay 2 to battery and ground. Thus at point 21 we will have applied a negative voltage from the 130-volt battery connected to the marking contact of the receiving relay of repeater B, and we will also have applied at point 21 a positive voltage of 130 volts from the battery 20. Accordingly the potential at point 21 will be approximately zero. Ground will be applied from the sleeve contact to jack J₂ and plug P₂, and sleeve contacts of plug P₁ and jack J₁ over conductor 22, 30,000-ohm resistance 23, to the negative pole of 130-volt battery 24 to ground. Accordingly, the voltage at point 25 will be approximately zero. Point 21 is connected to the upper electrode of gas-filled tube T and point 25 is connected to the lower electrode of gas-filled tube T. Hence, there will be no voltage across the electrodes and the tube will not operate. If a "hit" should now occur, or if signals should be received, on the line connected to the receiving relay of the telegraph repeater B, its armature will move to its spacing contact which is connected to the positive pole of a battery of 130 volts. Accordingly, a positive potential from said battery will now be applied to point 21, and a positive potential is applied to point 21 from the battery 20. This will cause the gas-filled tube to break down and complete the following circuit: from ground applied from the cord circuit to conductor 22, lower and middle electrodes of gas-filled tube T, conductor 23, contact and armature of relay 7, conductor 24, winding of relay 9, conductor 10, armature and contact of relay 2 to battery 20 and ground. This will operate relay 9 and close the following circuit: from ground battery 12, lower armature and contact of relay 9, conductors 13 and 14, lower contact of jack J₁, conductor 15, filament of lamp L to ground, thereby operating lamp L.

The attendant will then momentarily operate restore key K. If the operation of the lamp was due to a "hit" the operation of the key will operate relay 7 to break the previously traced circuit through the gas-filled tube T and the relay 9. The breaking of that circuit will cause relay 9 to release thereby breaking the previously traced circuit for relay 7. This relay is a slow release relay and after a short interval it will release and extinguish the lamp L and the attendant will know that there has been a hit on the line connected to the receiving relay of telegraph repeater B. If the operation of the lamp was due to a change in direction of transmission in signals being received on the receiving relay of telegraph repeater B, the operation of the circuit is the same as that described above except that each time the lamp is lighted by the operation of relay 9, it will be automatically restored by the release of relay 7. Thus the flashing of the lamp during the interval the restore key K is held operated will indicate to the attendant that the circuit was initially operated by a change in direction of transmssion instead of a "hit."

Assume now that the "hit" indicator A' is connected to a telegraph repeater such as C. Under these conditions positive battery of 130 volts connected to the marking contact of the receiving relay of repeater C will be connected to the following circuit: armature of the receiving relay of repeater C, through a 30,000-ohm resistance to the sleeve of jack J₃, sleeve contact of plug P₃, sleeve contact of plug P₄, sleeve contact of jack J₁, conductor 22, 30,000-ohm resistance 23 to the negative pole of battery 24 and thence to ground. Accordingly at point 25 there will be applied from battery 24 a negative voltage of 130 volts and there will also be applied a positive voltage of 130 volts from the battery connected to the marking contact of the receiving relay of repeater C. Accordingly the voltage at point 25 will be zero. Ground will be connected from the tip conductor of jack J₃, tip conductor of plug P₃, tip conductor of plug P₄, and tip conductor of jack J₁ to conductor 17. Accordingly, there will be applied to point 21 a zero voltage. As point 21 is connected to the upper electrode of the gas-filled tube T and point 25 is connected to the lower electrode of said tube, the tube will not operate. Assume now that a "hit" occurs on the line connected to the receiving relay of telegraph repeater C. This will move the armature of said relay to its spacing contact. Accordingly a negative voltage of 130 volts will be applied from the spacing contact over the previously traced path to point 25. As the negative pole of 130-volt battery 24 is also connected to point 25, this will cause the tube to break down and operate the previously traced circuit for relay 9. The function of the "hit" indicator will then be substantially the same as heretofore described when it was connected to the telegraph repeater B.

Accordingly, it will be seen that the "hit" indicator A' will function properly no matter whether it is connected to a telegraph repeater of the type shown as B or when it is connected with a telegraph repeater of the type shown as C. Furthermore, the mere connection of the "hit" indicator A to either of the telegraph repeaters shown, conditions it for operation without the necessity of first operating the key K and releasing it.

While the invention has been disclosed as embodied in certain specific forms which are deemed desirable, it is understood that it is capable of embodiment in many and other widely varied forms without departing from the spirit of the invention as defined by the appended claims.

What is claimed is:

1. In a telegraph system, a first telegraph repeater including a receiving relay having an armature cooperating with marking and spacing contacts to which are connected positive and negative batteries respectively, a second telegraph repeater including a receiving relay having an armature cooperating with marking and spacing contacts to which are connected negative and positive batteries respectively, and an alarm circuit adapted to be connected to either of said relay armatures and comprising a translating device and an alarm controlled thereby, said alarm circuit being so arranged that said translating device will not be operated when said alarm circuit is connected to either of said relay armatures and said armature is on its marking contact but will be operated when said armature is on its spacing contact.

2. In a telegraph system, a device for indicating "hits" on telegraph lines comprising a translating device and an alarm controlled thereby, switching means having tip and sleeve contacts, and circuit arrangements connecting said contacts to said translating device, said circuit arrangements being such that said translating device will be inoperative when positive potential is applied to said sleeve contact and ground is applied to said tip contact and said translating device will be operated when negative potential is applied to said sleeve contact and ground is applied to said tip contact.

3. In a telegraph system, a device for indicating "hits" on telegraph lines comprising a translating device and an alarm controlled thereby, switching means having tip and sleeve contacts, and circuit arrangements connecting said contacts to said translating device, said circuit arrangements being such that said translating device will be inoperative (1) when negative potential is applied to said tip contact and ground is applied to said sleeve contact and (2) when positive potential is applied to said sleeve contact and ground is applied to said tip contact and said translating device will be operated (3) when positive potential is applied to said tip contact and ground is applied to said sleeve contact and (4) when negative potential is applied to said sleeve contact and ground is applied to said tip contact.

4. In a telegraph system, a device for indicating "hits" on telegraph lines comprising a normally inoperative gas-filled discharge tube, a jack having tip and sleeve contacts, a first circuit completed over the contacts of said jack and the electrodes of said gas-filled discharge tube, a second circuit controlled by said first circuit and completed through said jack, a signaling device in said second circuit, and means associated with said jack contacts and tube and so arranged that when negative potential is applied to said tip contact and ground to said sleeve contact the voltage applied to said tube will be insufficient to cause it to break down and complete said first circuit, but when positive potential is applied to said tip contact and ground to said sleeve contact, the voltage applied to said tube will be sufficient to cause it to break down and complete said first circuit.

5. In a telegraph system, a device for indicating "hits" on telegraph lines comprising a normally inoperative gas-filled discharge tube, a jack having tip and sleeve contacts, a first circuit completed over the contacts of said jack and the electrodes of said gas-filled discharge tube, a second circuit controlled by said first circuit and completed through said jack, a signaling device in said second circuit, and means associated with said jack contacts and said tube and so arranged that when positive potential is applied to said sleeve contact and ground to said tip contact the voltage applied to said tube will be insufficient to cause it to break down and complete said first circuit, but when negative potential is applied to said sleeve contact and ground to said tip contact, the voltage applied to said tube will be sufficient to cause it to break down and complete said first circuit.

FRANK HAROLD HANLEY.